United States Patent Office 3,296,691
Patented Jan. 10, 1967

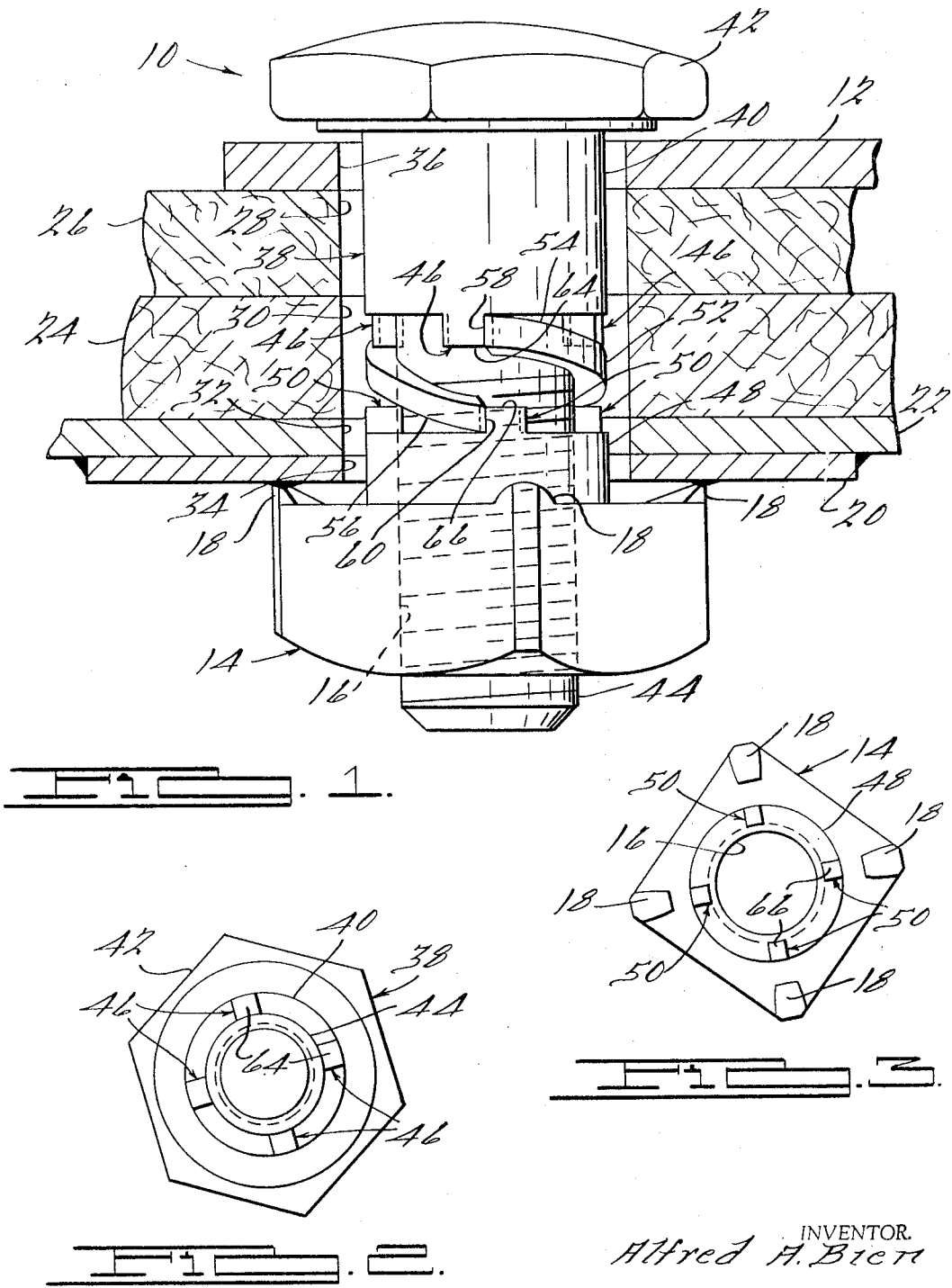

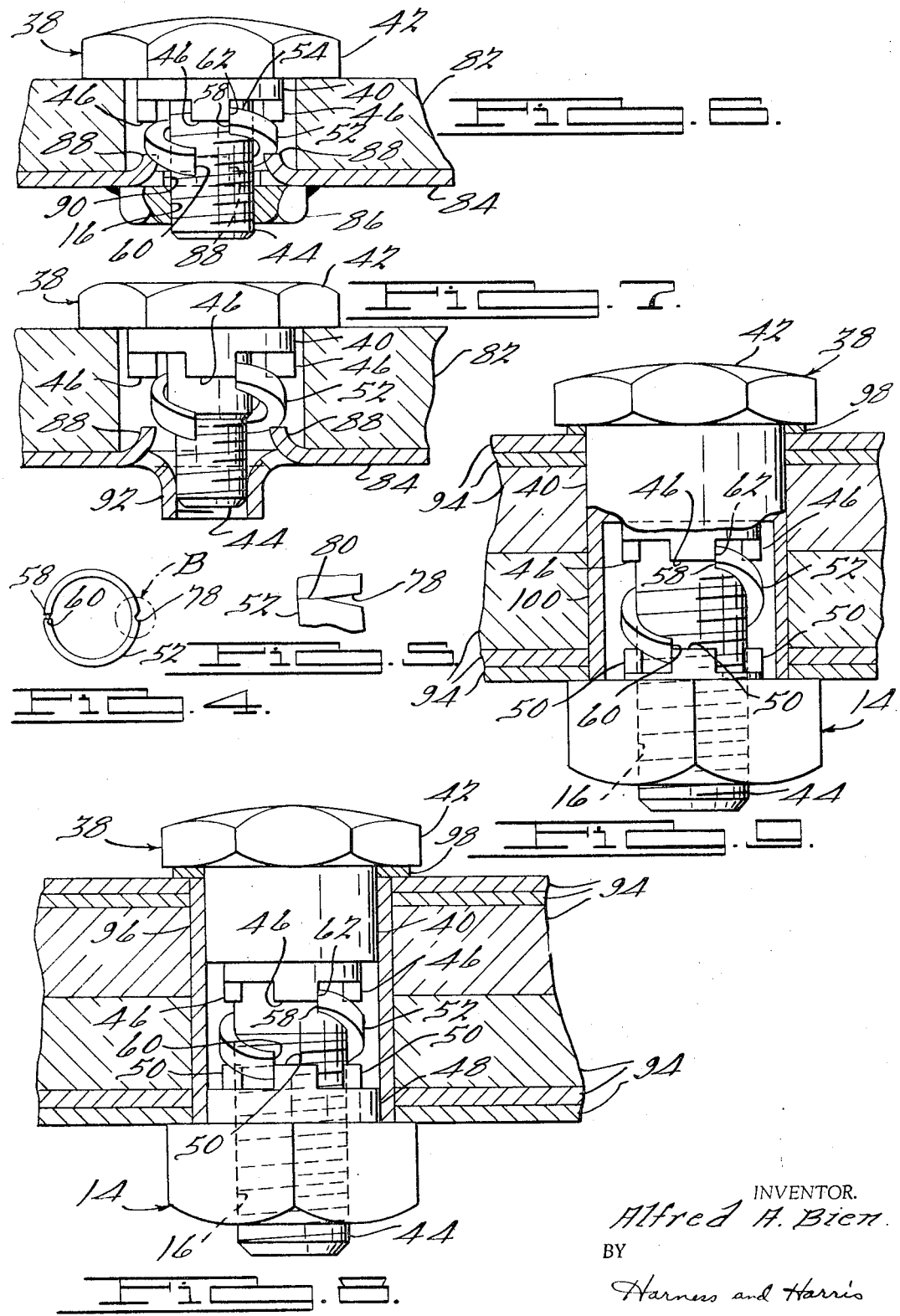

3,296,691
FASTENER ARRANGEMENT, METHOD OF SE-
CURING A SEAT BELT WITH THE FASTENER
ARRANGEMENT, AND THE JOINT PRODUCED
THEREBY
Alfred A. Bien, Dearborn, Mich., assignor to Chrysler
Corporation, Highland Park, Mich., a corporation of
Delaware
Filed Oct. 16, 1963, Ser. No. 316,553
9 Claims. (Cl. 29—434)

This invention relates generally to fasteners and more particularly to fastener arrangements of the self-locking variety.

In many instances a requirement imposed upon a fastener in that the fastener be precluded from unauthorized turning or in any way becoming disengaged after the fastener unit has been once secured.

For example, vehicle front seat safety seat belts are usually anchored to the vehicle floor behind the front seats. Fasteners employed for such anchoring purposes must, of course, be of the type which will not become accidentally disengaged.

Various designs of lock type fasteners have, heretofore, been proposed. For example, some have employed various coatings applied to the respective threaded portions for locking the threads after the fastener unit has been secured. Still others have slightly deformed threaded portions so as to cause interferences which are intended to maintain the respective threaded portions in engagement. None of these have been entirely satisfactory.

Accordingly, it is an object of this invention to provide a fastener arrangement which includes means for locking against unauthorized or accidental disengagement of the fastener.

Another object of this invention is to provide a self-locking fastener arrangement which can be secured with the application thereto of a minimum of force or energy and which requires the application of a comparatively much greater force in order to achieve disengagement.

Other more specific objects and advantages of the invention will become apparent from the following description and accompanying drawings wherein:

FIGURE 1 illustrates, in elevation, a fastener constructed in accordance with the teachings of this invention employed for anchoring a safety seat belt to a vehicle floor panel;

FIGURE 2 is an end view of one of the elements comprising the fastener of FIGURE 1;

FIGURE 3 is an end view of another of the elements comprising the fastener of FIGURE 1;

FIGURE 4 illustrates a modified form of one of the elements comprising the invention;

FIGURE 5 is an enlarged fragmentary view of the portion of FIGURE 4 indicated by the circle B; and FIGURES 6 through 9 are views, similar to FIGURE 1, respectively illustrating other embodiments of the invention.

Referring now in greater detail to the drawings, FIGURE 1 illustrates a fastener assembly 10 employed as a pivotal anchor for one end of a vehicle safety seat belt structure 12. A nut 14, having an internally threaded portion 16, is preferably provided with slight projections 18 for purposes of securing the nut 14, as by resistance welding, to a reinforcing plate 20 which is in turn secured to the vehicle floor pan 22. Layers of suitable insulation or padding 24 and carpeting or other floor covering material 26 may be provided atop the floor pan 22.

Generally coaxial apertures 28, 30, 32 and 34, formed respectively in members 26, 24, 22 and 20, and aperture 36 formed in the seat belt structure 12 collectively define a passage for the generally loose reception therethrough of a screw 38.

Screw 38 is comprised of a cylindrical body 40 having a head 42 at one end and an externally threaded shank portion 44 projecting axially from the other end. A plurality of generally axially directed projections 46, formed integrally with body 40, are circumferentially spaced about the shank portion 44. FIGURE 2, a view of screw 38 taken from the shank end thereof, better illustrates the generally spaced relationship of the projections 46.

Similarly nut 14 is provided with a cylindrical axial extension 48 also having a plurality of axially directed projections 50 formed thereon and spaced generally circumferentially about the axis thereof. FIGURE 3, an axial view of nut 14 taken from cylindrical extension 48 end thereof, illustrates the spaced relationship of the projections 50.

An annular helical lock or detent member 52, of generally rectangular cross-section, is provided about threaded shank portion 44 so as to be contained between nut 14 and body 40 of screw 38. As screw 38 is threadably rotated within nut 14 in the screw engaging direction, end surfaces 64 of projections 46 continue to slide over the upper surface 54 of lock member 52 while end surfaces 66 of projections 50 may likewise slide over the lower surface 56 of the lock. Each time, for example, that a projection 46 passes over upper end 58 of lock 52, the upper and lower ends 58 and 60, respectively, are moved relatively towards each other. As soon as projection 46 passes beyond end 58, that end then is permitted to move upwardly into the position generally illustrated by FIGURE 1. Whenever ends 58 and 60 of lock 52 assume a position as illustrated in FIGURE 1, that is, abutting against axially directed abutment surfaces 62 and 70 of projections 46 and 50, respectively, the turning of screw 38 in the reverse direction is effectively prevented.

In view of the above it should be apparent that the invention as disclosed by FIGURES 1, 2 and 3 provides a fastener arrangement comprised of a screw which can be threadably engaged with a cooperating nut using no greater effort than that available with a person's fingers and yet effectively preventing either disengagement or removal of the screw from the cooperating nut except by the exertion of a relatively much greater force which is sufficient to spread or deform the lock member 52. In this connection it should be further pointed out that during the period in which screw 38 is being turned into engagement with nut 14 a comparatively great mechanical advantage is realized in deflecting ends 58 and 60 of lock 52. The first portion of the mechanical advantage is, of course, due to the screw thread itself. That is, each of the abutment members 46 and 50 experience much greater relative angular motion than relative axial movement. Secondly, for example as when the abutment member 46 passes over end 58 of lock 52 causing maximum deflection of end 58, the bending lever arm of the lock 52 is at its maximum thereby minimizing the force required to be exerted by the abutment member 46 in order to achieve the required deflection of end 58. Finally, the lock 52 being of a helical configuration causes its upper and lower surfaces 54 and 56 to act as ramps for end surfaces 64 and 66 of projections 46 and 50 thereby providing a wedging action as the screw 38 is rotated.

The above-described mechanical advantage is not available for turning the screw 38 in the disengaging direction once ends 58 and 60 of lock 52 are brought into abutting engagement with abutment surfaces 62 and 70 of projections 46 and 50 as shown in FIGURE 1. Any attempt to create relative motion of screw 38 in the disengaging direction from the position shown in FIGURE 1 is effectively resisted by the lock member 52 which now exhibits a resisting force which is generally tangential to the projections 46 and 50.

The fastener unit 10 as illustrated in FIGURE 1 is particularly suited to anchoring of seat belts since such anchors are usually located behind the vehicle front seats where they are accessible to tampering as by children riding in the rear of the vehicle passenger compartment. Such possible tampering is of course effectively precluded even though the screw, in order to permit rotation of the end of seat belt 12 about the axis of screw 38, is relatively loosely received within nut 14.

It should be apparent that the lock 52 can be modified so as to possess various physical characteristics. For example, the free state helix of the lock member 52 can have any desirable lead suitable for the particular intended use. Also, lock 52 may be of any suitable material and further such material as will permit may be heat treated to control resiliency and/or hardness thereof.

FIGURES 4 and 5 illustrate a further modification of the helical lock member 52. As indicated generally in the circle B, and in an enlarged fragmentary view in FIGURE 5, lock 52 has formed therein a notch or indentation 78 causing a localized reduction in the cross-sectional area of the lock 52. Consequently, if a lock as illustrated in FIGURE 4 is employed in a fastener arrangement provided with, for example, projections 46, turning of screw 38 in the opening direction will cause ends 58 and 60 to be spread generally tangentially away from each other. As the ends 58 and 60 spread, the highest stress concentration occurs at the reduced cross sectional area causing that area to be stressed beyond its yield point and, therefore, fracturing as indicated generally at 80 of FIGURE 5.

It should be noted that even though the lock 52 of FIGURES 4 and 5 is intended to ultimately fracture, it nevertheless prevents unauthorized loosening or removal of screw member 38 because the initial force required to start to spread ends 58 and 60 is still relatively great.

FIGURE 6 illustrates a modification of the invention for securing a member 82 to a relatively thin panel 84. All elements of FIGURE 12 which are like or similar to those of FIGURE 1 are identified with like reference members. A nut 86, secured to panel 84 as by welding, threadably receives threaded shank 44 of screw 38 in the same manner as nut 14 of FIGURE 1. However, unlike nut 14, nut 86 is not provided with axially directed projections 50. In the embodiment of FIGURE 6, nut 86 is effectively secured to panel 84 and to a plurality of axially directed projections 88 formed thereon so as to be spaced generally circumferentially about aperture 90 and screw 38.

FIGURE 7 is a further modification of the invention as disclosed in FIGURE 6. In the embodiment of FIGURE 7, panel 84 not only has integrally formed projections 88 but also has an integrally formed internally threaded nut portion 92 which dispenses with the need for a separate nut as 86. It should, of course, be apparent that nut portion 92 need not project in the direction illustrated; nut portion 92 could be directed in the opposite direction and could in fact be received within the inner diameter of the lock ring 52.

FIGURES 8 and 9, similar to each other, illustrate a still further modification of the invention. All elements which are like or similar to those of FIGURE 1 are identified with like reference numbers. In the embodiment of FIGURE 8, nut 14, is not secured against rotation with respect to the various members 94 retained between head 42 and nut 14. A cylindrical bearing like element 96 closely received about portions 40 and 48 is intended to provide a continuous outer cylindrical surface as might be required where elements 94 are to have repeated relative angular motion with respect to each other about a common axis as provided by element 96. If desired, a relatively resilient member or an annular spacer 98 may be provided between head 42 and the elements 94.

FIGURE 9, a modification of the invention as disclosed by FIGURE 8, illustrates screw 38 having its body 40 formed so as to have an integral cylindrical extension 100 serving the same purpose as sleeve 96 of FIGURE 14.

The invention as disclosed by the foregoing comprises a screw and nut provided with resilient abutment means which readily permits the relative rotation of the screw and nut in one direction but prevents relative rotation in the opposite direction except with the application thereto of a greatly increased force. It should also be pointed out that unlike self-locking fastener arrangements of the prior art, the locking effectiveness of the invention is in no way dependent on the axial tension between the cooperating nut and screw since the lock is equally effective when the nut and screw are loosely secured to each other as when they are placed in axial tension as by securing cooperating members, located between the nut and screw head, against each other.

It should be apparent that in addition to the various embodiments and modifications disclosed, other embodiments and modifications of the invention are possible within the scope of the appended claims.

I claim:

1. A lock-type fastener assembly, comprising a screw having a plurality of first circumferentially spaced axially directed abutment surfaces, a nut threadably receiving said screw and having a plurality of second circumferentially spaced axially directed abutment surfaces, and a resilient annular lock member received generally about said screw and between said first and second abutment surfaces, said lock member being discontinuous at one point in order to provide axially spaced end surfaces, an axially extending recess formed in the outer circumference of said lock member at a point generally circumferentially spaced from said point of discontinuity, said end surfaces being effective to respectively abuttably engage one of said first abutment surfaces and one of said second abutment surfaces so as to prevent accidental disengagement of said screw from said nut and to resist relative motion of said screw in the disengaging direction until said lock member is caused to fail at said recess.

2. A lock-type fastener assembly, comprising a screw having a body portion and a threaded shank portion extending axially of said body portion, a plurality of first abutment portions formed on said body portion in a manner so as to be circumferentially spaced about the axis of said threaded portion, a tubular extension carried by said screw body portion and extending axially a substantial distance beyond said first abutment portions, a nut having an internally threaded portion threadably engaging said threaded shank portion, a plurality of second abutment portions formed on said nut in a manner so as to be circumferentially spaced about the axis of said internally threaded portion, a resilient helical lock member received within said tubular extension and about said shank portion, said lock member being axially positioned so as to be generally between said first and second abutment portions and having axially spaced and axially extending end surfaces, and an axially directed abutment surface formed on each of the abutment members, said lock member being effective upon said end surfaces respectively abuttably engaging abutment surfaces on said first and second abutment portions to resist relative motion of said screw in a disengaging direction.

3. A lock-type fastener assembly, comprising a screw having a body portion and a threaded shank portion extending axially of said body portion, a plurality of first abutment portions formed on said body portion in a manner so as to be circumferentially spaced about the axis of said threaded portion, a tubular extension carried by said screw body portion and extending axially a substantial distance beyond said first abutment portions, a nut having an internally threaded body portion threadably engaging said threaded shank portion, a plurality of second abutment portions formed on said nut body in a manner so as to be circumferentially spaced about the axis of said internally threaded portion, a portion of said nut body being adapted to be closely received within said tubular extension, a resilient helical lock member received within said tubular extension and about said shank portion, said lock member being axially positioned so as to be generally between said first and second abutment portions and having axially spaced and axially extending end surfaces, and an axially directed abutment surface formed on each of the abutment members, said lock member being effective upon said end surfaces respectively abuttably engaging abutment surfaces on said first and second abutment portions to resist relative motion of said screw in a disengaging direction.

4. A lock-type fastener assembly, comprising a screw having a body portion and a threaded shank portion extending axially of said body portion, a plurality of first abutment portions formed on said body portion in a manner so as to be circumferentially spaced about the axis of said threaded portion, a tubular extension carried by said screw body portion and extending axially a substantial distance beyond said first abutment portions, a nut having an internally threaded portion threadably engaging said threaded shank portion, a plurality of second abutment portions formed on said nut in a manner so as to be circumferentially spaced about the axis of said internally threaded portion, and a resilient helical lock member received within said tubular extension and about said shank portion, said lock member being axially positioned so as to be generally between said first and second abutment portions and having axially spaced end surfaces, said lock member being effective upon said end surfaces respectively abuttably engaging said first and second abutment portions to resist relative motion of said screw and disengagement thereof from said nut.

5. A lock-type fastener assembly, comprising a screw having a body portion and a threaded shank portion extending axially of said body portion, a plurality of first abutment portions formed on said body portion in a manner so as to be circumferentially spaced about the axis of said threaded portion, a tubular extension formed integrally with said screw body portion and extending axially a substantial distance beyond said first abutment portions, a nut having an internally threaded portion threadably engaging said threaded shank portion, a plurality of second abutment portions formed on said nut in a manner so as to be circumferentially spaced about the axis of said internally threaded position, a resilient helical lock member received within said tubular extension and about said shank portion, said lock member being axially positioned so as to be generally between said first and second abutment portions and having axially spaced and axially extending end surfaces, and an axially directed abutment surface formed on each of the abutment members, said lock member being effective upon said end surfaces respectively abuttably engaging abutment surfaces on said first and second abutment portions to resist relative motion of said screw in a disengaging direction.

6. An arrangement for pivotally anchoring a safety seat belt to a structural member of a vehicle, comprising a nut carried by said structural member at one side thereof, a threaded portion formed internally of said nut in a manner having the axis of said internally threaded portion disposed generally perpendicularly to said structural member, a plurality of first axially directed projections formed on said nut and spaced generally circumferentially about said internally threaded portion, a screw having a head and an externally threaded portion threadably engaging said internally threaded portion of said nut, a generally cylindrical body axially intermediate of said head and externally threaded portion, said screw extending through an aperture formed in said belt and loosely radially confining said seat belt generally about said cylindrical body, a plurality of second axially directed projections formed on said screw and spaced generally circumferentially about the axis thereof, and a resilient helical annular lock member contained by said screw circumferentially thereabout, said lock member having axially spaced ends for simultaneously abuttably engaging one of said first axially directed projections and one of said second axially directed projections for preventing relative movement of said screw in the direction of threadable disengagement from said nut while at the same time permitting said screw to be relatively loosely threadably engaged with said nut.

7. An arrangement for pivotally anchoring a safety seat belt to a structural member of a vehicle, comprising a nut secured to said structural member at one side thereof, a threaded portion formed internally of said nut in a manner having the axis of said internally threaded portion disposed generally perpendicularly to said structural member, a plurality of first projections formed on said nut and spaced generally circumferentially about said internally threaded portion, a screw having a head and an externally threaded portion threadably engaging said internally threaded portion of said nut, a generally cylindrical body axially intermediate of said head and externally threaded portion, said screw extending through an aperture formed in said belt and loosely radially confining said seat belt generally about said cylindrical body, a plurality of second projections formed on said screw and spaced generally circumferentially about the axis thereof, an axially extending abutment surface formed on one side of each of said first and second projections, and a resilient helical annular lock member contained by said screw circumferentially thereabout, said lock member having axially spaced ends for simultaneously abuttably engaging an abutment surface of one of said first projections and an abutment surface of one of said second projections for preventing relative movement of said screw in the direction of threadable disengagement from said nut.

8. An arrangement for pivotally anchoring a safety belt to a structural member of a vehicle comprising a nut secured to and carried by said structural member at one side thereof, a threaded portion formed internally of said nut in a manner having the axis of said internally threaded portion disposed generally perpendicularly to said structural member, a plurality of first projections formed on said nut and spaced generally circumferentially about said internally threaded portions, a screw having a head and an externally threaded portion threadably engaging said internally threaded portion of said nut, a generally cylindrical body axially intermediate of said head and externally threaded portion, said screw extending through an aperture formed in said belt and loosely radially confining said seat belt generally about said cylindrical body, a plurality of second projections formed on said screw and spaced generally circumferentially about the axis thereof, an axially extending abutment surface formed on one side of each of said first and second projections, and a resilient helical annular lock member contained by said screw circumferentially thereabout, said lock member having axially spaced and axially extending ends for simultaneously abuttably engaging an abutment surface of one of said first projections and an abutment surface of one of said second projections for preventing relative movement of said screw in the direction of threadable disengagement from said nut.

9. A method of pivotally securing a safety seat belt to a structural member of a vehicle wherein said member is adapted to carry thereon layers of insulating and floor forming materials, comprising the steps of forming a nut member to have an internally threaded portion and a plurality of first axially extending abutment surfaces circumferentially spaced about said threaded portion; forming an aperture through said structural member; welding said nut member to the underside of said structural member in a manner so as to have the axis of said threaded portion in general axial alignment with the axis of said aperture; forming apertures through said insulating and floor forming materials and arranging layers of said materials atop said structural member in a manner resulting in said apertures formed through said materials being in substantial axial alignment the axis of said threaded portion; forming an aperture through a safety seat belt; forming a screw to have a head portion, a threaded shank portion and a cylindrical body portion intermediate said head portion and threaded shank portion; forming a plurality of second axially extending abutment surfaces on said screw circumferentially spaced about said shank portion; forming a metallic lock member to be of helical configuration so as to have axially spaced ends which ends form axially extending end surfaces; inserting the screw shank portion through said seat belt aperture, through said apertures in said materials, through said helical lock member and into threadable engagement with said threaded nut portion; and threadably rotating said screw into engagement with said nut until said end surfaces are axially urged toward each other at least one time by the screw and nut and subsequently allowed to move axially away from each other so as to be in general juxtaposition to at least one of said first abutment surfaces and one of said second abutment surfaces.

References Cited by the Examiner

UNITED STATES PATENTS

| | | | |
|---|---|---|---|
| 848,176 | 3/1907 | Jordan | 151—13 |
| 859,054 | 7/1907 | Fischer | 151—41 |
| 1,048,039 | 12/1912 | Church | 151—13 |
| 1,169,561 | 1/1916 | Nichols. | |
| 2,134,749 | 11/1938 | Burt | 29—413 |
| 2,607,259 | 8/1952 | Forster | 29—413 X |
| 2,855,215 | 10/1958 | Sheren | 297—385 X |
| 3,185,246 | 5/1965 | Maurer. | |

FOREIGN PATENTS

| | | |
|---|---|---|
| 25,253 | 1908 | Great Britain. |

CHARLIE T. MOON, *Primary Examiner.*